(12) United States Patent
Schmid

(10) Patent No.: US 9,229,600 B2
(45) Date of Patent: Jan. 5, 2016

(54) MULTI-TOUCH ACTIVE DISPLAY KEYBOARD

(75) Inventor: Lars Schmid, London (GB)

(73) Assignee: FLEXENABLE LIMITED, Cambridge, Cambridgeshire (GB)

( * ) Notice: Subject to any disclaimer, the term of this patent is extended or adjusted under 35 U.S.C. 154(b) by 1619 days.

(21) Appl. No.: 12/303,709

(22) PCT Filed: May 22, 2007

(86) PCT No.: PCT/GB2007/050283
§ 371 (c)(1),
(2), (4) Date: Feb. 12, 2010

(87) PCT Pub. No.: WO2007/141566
PCT Pub. Date: Dec. 13, 2007

(65) Prior Publication Data
US 2010/0127992 A1     May 27, 2010

(30) Foreign Application Priority Data

Jun. 5, 2006 (GB) .................................... 0611032.4
Sep. 29, 2006 (GB) .................................... 0619172.0

(51) Int. Cl.
*G06F 3/045*     (2006.01)
*G06F 3/0488*     (2013.01)

(52) U.S. Cl.
CPC ............ *G06F 3/045* (2013.01); *G06F 3/04886* (2013.01); *G06F 2203/04102* (2013.01); *G06F 2203/04104* (2013.01)

(58) Field of Classification Search
CPC ............... G06F 3/045; G06F 3/04886; G06F 2203/04104
USPC ................. 715/773; 345/173–175; 178/18.05
See application file for complete search history.

(56) References Cited

U.S. PATENT DOCUMENTS 5,623,280 A    4/1997   Akins et al.
5,748,185 A    5/1998   Stephan et al.
(Continued)

FOREIGN PATENT DOCUMENTS

CA     2355434     2/2002
JP     58-56190     4/1983
(Continued)

OTHER PUBLICATIONS

Examination Report issued in Great Britain Application No. GB0619172.0 on Apr. 21, 2011 in 2 pages.
(Continued)

*Primary Examiner* — Matthew Fry
(74) *Attorney, Agent, or Firm* — Knobbe Martens Olson & Bear LLP

(57) ABSTRACT

A touch sensitive display device includes a display fabricated on a flexible substrate, the display having a viewing surface; and a plurality of touch sensitive elements under the display, each of the plurality of touch sensitive elements including a touch sensitive sensor, the sensors being operable by touching the viewing surface of the display, and each of the plurality of touch sensitive elements having an output for outputting a signal responsive to the viewing surface being touched, wherein each of the plurality of touch sensitive elements defines a region of the viewing surface in which the touch sensitive element produces an output in response to a touch, and wherein the plurality of touch sensitive elements are arranged such that two or more substantially simultaneous touches of different regions of the viewing surface produces output signals corresponding to the two or more touches of the viewing surface.

26 Claims, 12 Drawing Sheets

(56) References Cited

U.S. PATENT DOCUMENTS

| | | | |
|---|---|---|---|
| 5,815,141 A * | 9/1998 | Phares | 345/173 |
| 5,907,375 A | 5/1999 | Nishikawa et al. | |
| 6,118,433 A * | 9/2000 | Jenkin | G06F 3/0488 345/1.3 |
| 6,344,662 B1 * | 2/2002 | Dimitrakopoulos et al. | 257/40 |
| 7,874,923 B2 * | 1/2011 | Mattice | G06F 3/041 463/46 |
| 2001/0022632 A1 * | 9/2001 | Umemoto et al. | 349/12 |
| 2001/0040554 A1 | 11/2001 | Nakagawa | |
| 2002/0018043 A1 | 2/2002 | Nakanishi | |
| 2002/0033792 A1 * | 3/2002 | Inoue | 345/107 |
| 2002/0149572 A1 * | 10/2002 | Schulz et al. | 345/174 |
| 2003/0026971 A1 | 2/2003 | Inkster | |
| 2004/0121599 A1 | 6/2004 | Aminpur et al. | |
| 2004/0212599 A1 | 10/2004 | Cok et al. | |
| 2005/0024344 A1 | 2/2005 | Trachte | |
| 2005/0035374 A1 | 2/2005 | Malajovich | |
| 2005/0078099 A1 * | 4/2005 | Amundson | H01L 27/12 345/204 |
| 2005/0118922 A1 * | 6/2005 | Endo | 445/24 |
| 2005/0162402 A1 * | 7/2005 | Watanachote | 345/173 |
| 2005/0174335 A1 * | 8/2005 | Kent et al. | 345/173 |
| 2005/0280634 A1 * | 12/2005 | Tanabe et al. | 345/173 |
| 2006/0097991 A1 | 5/2006 | Hotelling et al. | |
| 2006/0108579 A1 | 5/2006 | Kim et al. | |
| 2006/0214154 A1 | 9/2006 | Yang et al. | |
| 2006/0250558 A1 | 11/2006 | Burns et al. | |
| 2006/0286737 A1 | 12/2006 | Levy et al. | |
| 2007/0085837 A1 * | 4/2007 | Ricks | G02F 1/13338 345/173 |
| 2007/0085838 A1 | 4/2007 | Ricks et al. | |
| 2008/0055274 A1 | 3/2008 | Van Berkel et al. | |
| 2008/0158171 A1 | 7/2008 | Wong et al. | |
| 2013/0265280 A1 | 10/2013 | Burns et al. | |

FOREIGN PATENT DOCUMENTS

| | | |
|---|---|---|
| JP | 2002-259053 A | 9/2002 |
| JP | 2002-259053 A | 9/2002 |
| JP | 2004-046115 A | 2/2004 |
| JP | 2004-046115 A | 2/2004 |
| JP | 2004-279707 | 10/2004 |
| JP | 2004-279707 A2 | 10/2004 |
| JP | 2005-183616 A | 7/2005 |
| JP | 2005-183616 A | 7/2005 |
| WO | WO 97/18547 | 5/1997 |
| WO | 99/10939 A2 | 3/1999 |
| WO | WO 99/10939 | 3/1999 |
| WO | WO 99/19855 | 4/1999 |
| WO | WO 99/19855 | 9/1999 |
| WO | 2004/066136 A2 | 8/2004 |
| WO | 2004/070466 A2 | 8/2004 |
| WO | WO 2004/066136 | 8/2004 |
| WO | WO 2004/070466 | 8/2004 |
| WO | 2005/010735 A1 | 2/2005 |
| WO | 2005/010822 A1 | 2/2005 |
| WO | WO 2005/010735 | 2/2005 |
| WO | WO 2005/010822 | 2/2005 |
| WO | 2005/078566 A1 | 8/2005 |
| WO | WO 2005/078566 | 8/2005 |
| WO | WO 2006/020304 | 2/2006 |
| WO | 2006/056808 A1 | 6/2006 |
| WO | 2006/059162 A1 | 6/2006 |
| WO | 2006/061658 A1 | 6/2006 |
| WO | WO 2006/056808 | 6/2006 |
| WO | WO 2006/059162 | 6/2006 |
| WO | WO 2006/061658 | 6/2006 |
| WO | 2007/012899 A1 | 2/2007 |

OTHER PUBLICATIONS

International Search Report for International Application No. PCT/GB2007/050283, Dated Feb. 15, 2008.

Examination Report issued in Great Britain application No. GB0619172.0 on Sep. 23, 2010 in 4 pages.

European Search Report, issued in Application No. 07 733 704.6, dated Nov. 12, 2010, 6 pages.

European Search Report, issued in Application No. 07 733 704.6, dated Apr. 6, 2009, 3 pages.

International Search Report issued on PCT/GB2006/050220 dated Dec. 22, 2006.

Rogers, et al., "Low-voltage 0.1 mm organic transistors and complementary inverter circuits fabricated with a low-cost form of near-field photolithography," Applied Physics Letters, vol. 75, No. 7, Aug. 16, 1999, pp. 1010-1012.

Brittain, et al., "Protein crystals in the spotlight," Physics World, vol. 11, No. 5, May 1998, p. 31-36.

Bao, et al., "High-Performance Plastic Transistors Fabricated by Printing Techniques," Chemistry of Materials, 9, pp. 12999-21301 (1997).

Rogers, et al., "Printed Plastic Electronics and Paperlike Displays", Journal of Polymer Science: Part A: Polymer Chemistry, vol. 40, 2002, pp. 3327-3334, XP008042599.

Decision to Refuse a European Patent Application on 06 765 369.1-2224 dated Jul. 24, 2012.

European Search Report issued on EP 07733704.6 dated Nov. 12, 2010.

European Search Report issued on EP 07733704.6 dated Apr. 6, 2009.

Exam Report issued on GB 0619172.0 dated Apr. 21, 2011.

International Search Report issued on PCT/GB2007/050283 dated Feb. 15, 2008.

Exam Report issued on GB 0619172.0 dated Sep. 23, 2010.

Decision to Refuse a European Patent Application on EP 06 765 369.1-2224 dated Jul. 24, 2012.

Translated Questioning dated Apr. 16, 2013 for Japanese Patent Application No. 2008-523463.

International Search Report from PCT/GB2006/050220 dated Dec. 22, 2006.

Rogers, et al., "Low-voltage 0.1 mm organic transistors and complementary inverter circuits fabricated with a low-cost form of near-field photolithography," Appl. Phys. Lett. 75, 1010 (1999).

Brittain, et al., "Protein crystals in the spotlight," Physics World, May 1998, p. 31.

Bao, et al., "High-Performance Plastic Transistors Fabricated by Printing Techniques," Chem Mat. 9, 12999 (1997).

Rogers, et al., "Printed Plastic Electronics and Paperlike Displays", Journal of Polymer Science, Part A: Polymer Chemistry, vol. 40, pp. 3327-3334 (2002).

* cited by examiner

MULTI-TOUCH ACTIVE DISPLAY KEYBOARD

CROSS-REFERENCE TO RELATED APPLICATIONS

This application is the U.S. National Phase under 35 U.S.C. §371 of International Application No. PCT/GB2007/050283, filed May 22, 2007, designating the United States and published in English on Dec. 13, 2007, as WO 2007/141566, which claims priority to United Kingdom Application No. 0611032.4, filed Jun. 5, 2006 and United Kingdom Application No. 0619172.0, filed Sep. 29, 2006.

FIELD OF THE INVENTION

The present invention relates to flexible resistive touch screen components. In particular, to a flexible resistive touch screen component that incorporates flexible resistive touch screen technology beneath a flexible display.

DESCRIPTION OF RELATED ART

In patent number US20060097991 "Multipoint Touch screen" a multi-touch touch screen is disclosed that comprises a pixellated array of transparent capacitance sensing nodes and is positioned in front of the display.

Other prior art can be found in CA 2,355,434 "Multi-point Touch Pad"; WO 99/19855 "Resistive touch screen having multiple selectable regions for pressure discrimination" and WO 2006/020304 "Mode-based graphical user interfaces for touch sensitive input devices".

However, the technology of onscreen resistive touch keyboards is currently unable to register the touch of two or more input-keys by a user simultaneously. Therefore, there is a need for a better replacement of conventional mechanical keyboards with resistive touch screen technology that is able to register the simultaneous touch of two or more input keys by a user.

Conventional keyboards, as shown in FIG. 1, are composed of keys which are effectively a number of individual input devices which are separately operated when contact is made and pressure is applied by the user. This therefore enables the use of two keys to be operated by the user simultaneously, resulting in the registration of each input-key. For example, the registration of an operator's touch of more than one input key per operation, such as 'SHIFT' and a letter using conventional keyboards will provide a capital letter. Whereas, the same operation when using a conventional resistive touch screen will only result in the registration of the first of the input keys that was touched.

One way to add would be to register the 'SHIFT' key as a 'one-off' 'TAPSLOCK' key. Therefore, only the key that is pressed immediately after the 'SHIFT' key has been pressed will provide a capital letter.

FIG. 2 shows a resistive touch screen keyboard, in which the whole keyboard is operated as a single input device and there is no possibility of more than one input-key being registered. In order to achieve capital letters, conventional touch screens 'turn-on' the 'SHIFT' key to enable all subsequent keys to be typed as capital letters. However, the 'SHIFT' key will actually have to be 'turned-off' in order to achieve, for example, a lower case letter following an upper case letter.

SUMMARY OF THE INVENTION

Therefore, a touch screen that includes features such as a multi-touch sensitive touch screen with full keyboard and mouse simulation is desirable. A touch screen which can be flexed would be advantageous, as well as a changeable interface and low power consumption.

We will describe embodiments of the present invention that addresses the problem of only being able to operate and register the input of a single touch key per operation of a touch screen keyboard as is shown in FIG. 3. In addition, we will describe embodiments of the present invention that offer a low cost solution by using standard resistive touch screens that are obtainable at low cost.

According to the present invention there is provided a touch sensitive display device comprising a display fabricated on a flexible substrate, the display having a viewing surface; and a plurality of touch sensitive elements under the display, each of the plurality of touch sensitive elements comprising a touch sensitive sensor, the sensors being operable by touching the viewing surface of the display, and each of the plurality of touch sensitive elements having an output for outputting a signal responsive to the viewing surface being touched, wherein each of the plurality of touch sensitive elements defines a region of the viewing surface in which the touch sensitive element produces an output in response to a touch, and wherein the plurality of touch sensitive elements are arranged such that two or more substantially simultaneous touches of different regions of the viewing surface produces output signals corresponding to the two or more touches of the viewing surface.

Preferably, the touch-sensitive sensor comprises a continuous sensor substrate. Alternatively the touch sensitive sensors comprise a plurality of sensor substrates, one for each region defined by a touch-sensitive element. Preferably, the touch sensitive elements under the display are on the side of the flexible substrate opposing the viewing surface.

The present invention also provides a flexible display device incorporating a touch sensitive keyboard, said device comprising a display surface and a touch sensor behind said display surface, and wherein said touch sensor has at least two regions each with at least one electrical contact substantially electrically separate from the other region, a first of said regions being configured to define a plurality of user-operable keys, a second of said regions being configured to define at least one user-operable combination keys for operation in combination with one of said plurality of keys, and wherein said device has electrical output connections which enable operation of said combination key simultaneously with operation of one of said plurality of keys to be detected.

The present invention further provides a method of producing a touch screen component, the component comprising a display having a viewing surface, and a plurality of touch screen elements, the touch screen elements comprising a touch sensitive sensor, the method comprising: fabricating the display on a flexible substrate; and mounting the plurality of touch screen elements under the display such that each of the plurality of touch sensitive elements defines a region of the viewing surface in which the touch sensitive elements produces an output in response to a touch of the viewing surface, and such that two or more substantially simultaneous touches of different regions of the viewing surface produces an output signal from an output of the touch sensitive element corresponding to the two or more touches of the viewing surface.

The present invention still further provides a method of producing a touch signal responsive to two or more substantially simultaneous touches of two ore more regions of a viewing surface of a touch sensitive display device, the two or more regions corresponding to two or more different regions defined by the touch sensitive elements, the method comprising: receiving a signal from each of the touch sensitive elements corresponding to the two or more regions being touched; identifying the two or more regions being touched using the signals from the touch sensitive elements; outputting a touch signal responsive to the identification.

There are several technologies for providing a form of input means for a touch pad or touch screen; for example capacitive technology, surface acoustic wave technology and resistive technology. Preferably, embodiments of the present invention incorporate the resistive touch screen component is integrated with a display media and a backplane incorporating a flexible substrate to form a flexible resistive touch screen structure configuration, as will be described below.

The present invention can be used with a range of different display technologies, including, but not limited to, liquid crystal, emissive light-emitting diode, and electrophoretic displays. An advantage of the present invention is that it allows the integration of a multi-touch resistive touch-screen functionality with the display without impairing the optical quality or reducing the active area of the display.

Preferably, embodiments of the present invention incorporate a flexible display, which enables the touch screen to be positioned behind the display and therefore results in the borders described above becoming substantially invisible to the user. Preferably, embodiments incorporate the resistive touch screen configuration technology disclosed within patent number GB0515175.8. The present invention provides a novel device configuration for a resistive touch screen structure which incorporates a flexible display medium in contact with a flexible backplane.

Preferably, the backplane comprises an active matrix array of transistors and is formed on a flexible substrate. Preferably the flexible display medium is brought in contact with the flexible backplane either through direct deposition of a display active layer, such as an organic light-emitting diode or liquid-crystal display cell or through lamination with a display medium, such as, but not limited to, an electrophoretic, electrochromic or electronic paper display medium on an also flexible counter substrate. The display comprising the flexible backplane and the flexible display medium is laminated on top of a resistive touch screen sensor, which is operable from the top by applying pressure to the display media. By locating the touch screen sensor behind the flexible display the optical quality of the display is not impaired by the finite optical absorption and reflection of the metallic and dielectric layers of the touch screen sensor. No optical design compromise or optical engineering of the display or the touch screen is necessary to integrate the touch screen functionality with the display.

According to a preferred embodiment of the present invention the flexible touch sensitive display device comprises an active matrix of organic field-effect transistors (FETs). An organic FET comprises an active semiconducting layer of a conjugated polymer or a small conjugated molecule. Preferably, the organic FET also comprises an organic gate dielectric layer in the form of either a solution processed polymer dielectric, such as, but not limited to, polymethylmethacrylate (PMMA) or polystyrene (PS) or an organic gate dielectric deposited by chemical vapour deposition, such as, but not limited to, parylene. Preferably, the thickness of the organic dielectric layer is selected within the range of 200 nm and 1 micron. If the dielectric layer is thinner than 200 nm, a lower device yield is observed, and the devices are more prone to mechanical damage and shorting caused by the mechanical pressure exerted on the active matrix when operating the touch sensor. If the dielectric is thicker than 1 mm, the gate capacitance is too low to achieve the necessary ON-OFF current ratio needed for operation of the display. Organic field-effect transistors, in particular organic FETs comprising conjugated polymer semiconductors and organic gate dielectrics have excellent mechanical properties, such that they do not degrade when the flexible touch sensitive active matrix display device is repeatedly bent during operation. Also, organic FETs do not exhibit degradation in their performance when mechanical pressure is applied with a stylus or another sharp, pointed object to operate the touch screen. In contrast many inorganic FETs such as conventional amorphous or polycrystalline FETs are prone to mechanical damage and formation of microcracks when the mechanical stress applied to the layers during operation and bending of the flexible touch sensitive active matrix display. In contrast, the flexible touch sensitive active matrix display device according to the present invention can be bent repeatedly to a radius of curvature of less than 5 cm.

To achieve the necessary flexibility of the touch sensitive active matrix display the thickness of any of the substrates used for the touch sensor and for the active matrix display is preferably in the range of 10 mm to 250 mm, more preferably in the range of 20 mm to 200 mm. If the thickness of any of the substrates is thicker than this range, the flexibility of the device is impaired. If any of the substrates in between the viewing surface and the bottom substrate of the touch sensor is thicker than 250 mm the resolution of the touch screen is degraded, since high mechanical forces are required to transmit the mechanical pressure from the viewing surface of the display to the touch sensor mounted underneath. The thickness of the bottom substrate of the touch sensor can in principle be made thicker than any of the other substrates of the device, since it does not affect the operation of the touch screen. However, the thickness of the bottom substrate of the touch sensor is limited by the overall bending requirements for the device.

Preferably the active matrix array of FETs is located near the neutral axis of the device, and in order to achieve this, the thickness of the bottom substrate cannot be significantly larger than the other substrates of the device. Let $d1$ be the thickness of the flexible substrate between the display medium/active matrix and the viewing surface of the device, $d2$ the thickness of the flexible substrate on which the active matrix is formed, and $d3/d4$ the upper and bottom flexible substrate of the touch sensor, respectively. In one embodiment of the invention the substrate of the active matrix and the upper flexible substrate of the touch sensor are glued together with a pressure sensitive adhesive. Assuming that the thickness of the various active layers of the active matrix, the display medium and the touch sensor are small compared to that of any of the substrates, then $d2+d3+d4 \gg d1$.

Alternatively, the neutral axis of the device might be selected to be in the plane of the touch sensor elements. In the case of a resistive touch sensor large stress due to bending can lead to erroneous signals from the touch sensor since bending can lead to the two sensing electrodes touching in the absence of mechanical input. This can be minimized by placing the touch sensor element in the neutral axis, i.e., $d4 \gg d1+d2+d3$.

According to a preferred embodiment of the present invention a method is disclosed of producing a multi-touch key input touch screen in order to allow the registration of an operator's multi-touch function. The present invention provides touch screen technology that incorporates a plurality of touch screen components that are mounted adjacent to each other on a touch screen keyboard.

The present invention provides a method of processing a resistive touch screen keyboard wherein a multi-touch key input function per operation is enabled within a flexible touch screen technology. A series of flexible touch screens positioned adjacent to each other are mounted to allow the operation of two simultaneous touch-inputted touch keys to be registered.

The present invention may be used within known touch screen keyboard configurations, which results in each touch screen being surrounded by the associated circuit layer routing (as is seen in FIG. 5). Such a resistive touch screen preferably comprises a top circuit layer on a top substrate, a bottom circuit layer on a bottom substrate, and a layer of protective coating, such as ITO. The two circuit layers may be separated by a spacer adhesive. This has the effect of presenting each touch screen as a separate and individual input device.

BRIEF DESCRIPTION OF THE DRAWINGS

To help understanding of the invention, a specific embodiment thereof will now be described by way of example and with reference to the accompanying drawings, in which.

DETAILED DESCRIPTION OF PREFERRED EMBODIMENTS

Broadly speaking the present invention provides a multi-touch resistive touch screen underneath a flexible display. The touch screen keyboard is able to register the substantially simultaneous touching of two or more input-keys by a user. This is achieved by the incorporation of more than one touch screen within a touch screen keyboard. The multi-touch touch screen functionality is integrated either as a number of discrete, separate touch-screen elements mounted underneath the flexible display or as a single integrated touch screen with several touch-screen elements integrated onto a single substrate and mounted underneath the flexible display.

Example 1

A multi-touch resistive touch screen is integrated with a flexible display by incorporating a series of touch screen touch sensitive elements integrated adjacent to each other on a single substrate mounted underneath the flexible display.

A preferred embodiment is disclosed according to the present invention, wherein a multi-touch key input function per operation is enabled within flexible touch screen technology. A series of flexible individual touch screen touch sensitive elements are integrated together on a single substrate. Each individual touch screen touch sensitive element is mounted on the substrate so as to allow the operation of the touch screen by two or more substantially simultaneous touches of the touch screen display by the user.

Figure 5:
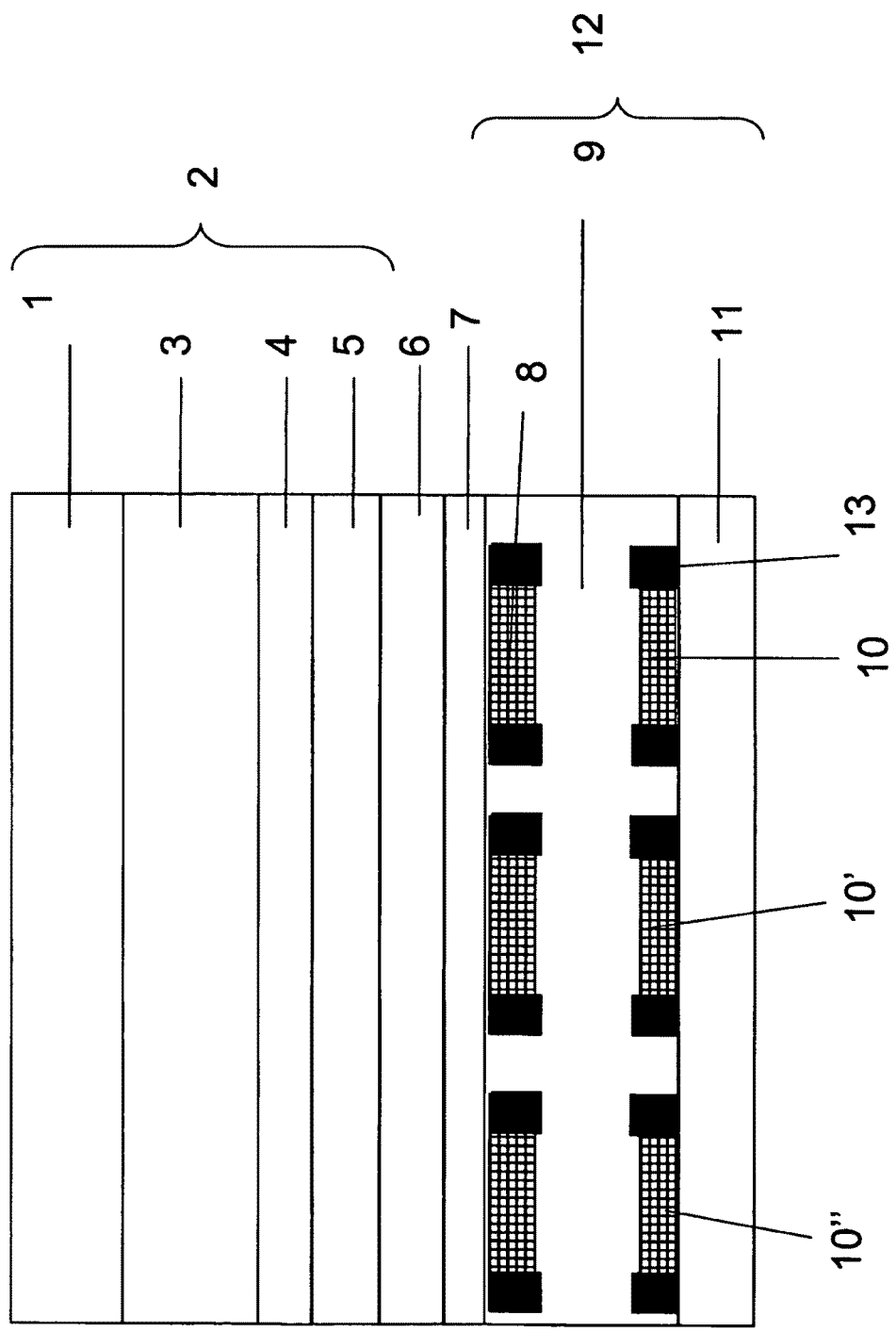
FIG. 5 shows a schematic cross-sectional diagram of a multi-touch touch screen integrated with a flexible display according to example 1 of the present invention.

FIG. 5 shows a device configuration for a resistive touch screen 12 integrated with a flexible display 2. The flexible display comprises a substrate 5, display backplane 4 comprising, for example, an active matrix of thin-film transistors or a passive matrix of interconnect lines, a display medium 3 and a top substrate 1 comprising also the counter electrodes to apply voltage signal across the individual pixel of the display. Preferably, an electrophoretic display media is incorporated within the device structure and is located over the back plane. The back plane incorporates a flexible substrate 5 in order to enable transmitting the pressure signal caused by the user input to the resistive touch screen mounted underneath the display. The substrate 5 may be a thin flexible glass or plastic substrate or a flexible metallic foil. Preferably the flexible substrate consists of a polymer film, such as polyethyleneterephtalate (PET) or polyethylenenaphtalene (PEN). The display media 3 with the top substrate 1 and display back plane 4 are laminated together.

The integrated touch screen is integrated onto the substrate of the device by adhering the touch screen directly to the back plane, for example, by utilizing a suitable pressure sensitive adhesive (PSA) 6.

As is disclosed in patent number GB0515175.8, the above described configuration allows for 100% optical clarity to be achieved by incorporating a touch screen component onto the backside of the flexible display. FIG. 5 also illustrates the elements of the resistive touch screen component 12 that is located on the underneath side of the device. A conducting lower layer 10 is deposited over a bottom substrate 13. The bottom substrate 13 is preferably also a flexible substrate, such as polyethyleneterephtalate (PET) or polyethylenenaphtalene (PEN). Alternatively, in situations where overall flexibility of the device is not a requirement, the bottom substrate 13 may also be a rigid substrate, such as a glass substrate or a rigid plastic substrate, or a flexible substrate mounted onto a rigid carrier, such as a rigid casing. Mounting the touch-screen sensor onto a rigid support has the advantage of improving the sensitivity of the touch screen to applied pressure from the top as it prevents deformation of the lower substrate in response to applied local pressure. Generally, the choice of the bottom substrate 13 is less critical for the operation of the touch screen than of the other substrate below and can be chosen according to whether the device is used as a rigid, conformal or truly flexible device.

A layer of insulating spacer dots 9 are positioned over the lower conductor layer, followed by a further upper layer of conducting material 8, which may be of the same material as the lower layer of conductor material. The spacer dots are positioned in between the conductive layers, in order to separate the said lower and upper conductor layers 10, 8. An upper flexible substrate film 7, such as, but not limited to a plastic substrate, such as PET or PEN, a thin metal foil substrate, such as steel, or a thin glass substrate completes the resistive touch screen component, by forming the upper substrate of the said component. A preferred thickness of the upper substrate material is between 25 µm-50 µm in order to achieve optimum sensitivity of the touch screen to local pressure applied from the top. Preferably the substrate is a plastic substrate.

In a first embodiment of the present invention, the conductive layers 10, 8 of the touch screen can be fabricated from either transparent conductors such as ITO, or non-transparent conductor material, such as a thin metallic layer. In many cases a highly conducting interconnect such as silver, aluminium or copper is used around the edges of the touch screen electrode 10 in order to minimize resistive voltage drops along the interconnects that connect the electrode 10 to the connectors on the edge of the touch screen. In the first embodiment of the present invention several touch screen touch sensitive elements with separate electrodes 10, 10', 10" are integrated on the same substrate 11 and mounted underneath the flexible display 2 in the appropriate position (see FIG. 3).

Each of the touch sensitive elements define a region of the viewing surface of the display wherein the action of a touch of the viewing surface within a region produces an output from the associated touch sensitive element in response to that touch.

In contrast to a device structure where the resistive touch screen is located on top of the display, i.e. in between the user and the display medium, the configuration described here, where the touch screen is hidden from the user behind the display does not require the touch screen to be transparent. Thus, cheap, non-transparent metals such as copper or aluminium can be used for the electrode of the touch screen. Within this novel device configuration, the ability to use a non-transparent conductive material can be used to increase the flexibility of the resistive touch screen device, as thin films of ductile metals are often more flexible than the use of a brittle ceramic such as ITO. In addition, the use of metallic materials for the conductive layers will also have the effect of reducing costs, as thin films of metallic material are generally cheaper materials than ITO. In addition, the effects of the use of metallic layers may also be seen in general performance improvements within the touch screen component, due to the fact that higher conductivity levels may be achieved with metallic materials than with ITO. A particular advantage of mounting the touch screen components underneath the display is that for a reflective or emissive display medium the opaque electrodes 13 are not visible from the surface of the display and do not reduce the active area of the display.

To achieve good sensitivity of the touch screen to applied pressure from the top, the upper substrate of the touch screen 7, and the bottom and top substrates 5 and 1 of the flexible display as well as the other layers above the touch screen should be as thin as possible, while maintaining sufficient mechanical integrity and rigidity during manufacture as well as operation. Preferably the thickness of these substrates is on the order of 10-150 µm, more preferably on the order of 20-75 µm.

Figure 6:
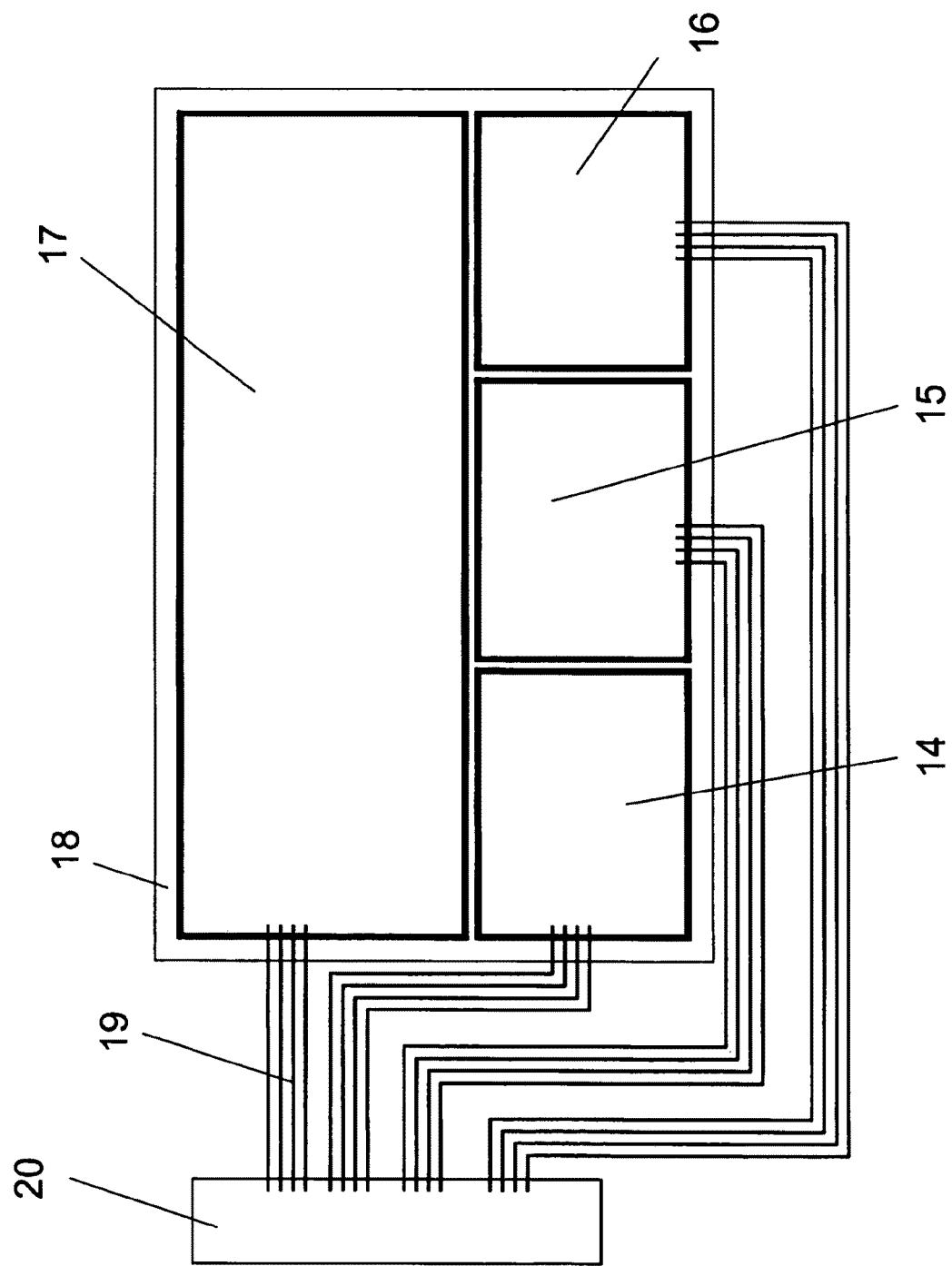
FIG. 6 shows a top-view of the integration of a multi-touch touch screen with four individual touch screen elements and connectors onto a single substrate according to example 1 of the present invention.

A 4-wire touch screen technology may be used, in which each touch screen is addressed by four wires, two connected along the x-direction to the upper electrodes 8 and two along the y-direction to the lower electrode 10. Other touch screen configurations may be used. As shown in FIG. 6 the addressing lines from each of the touch screens 14, 15, 16, and 17 integrated together on the substrate 18 connect the touch screen elements to the touch screen controller 20.

Figure 4:
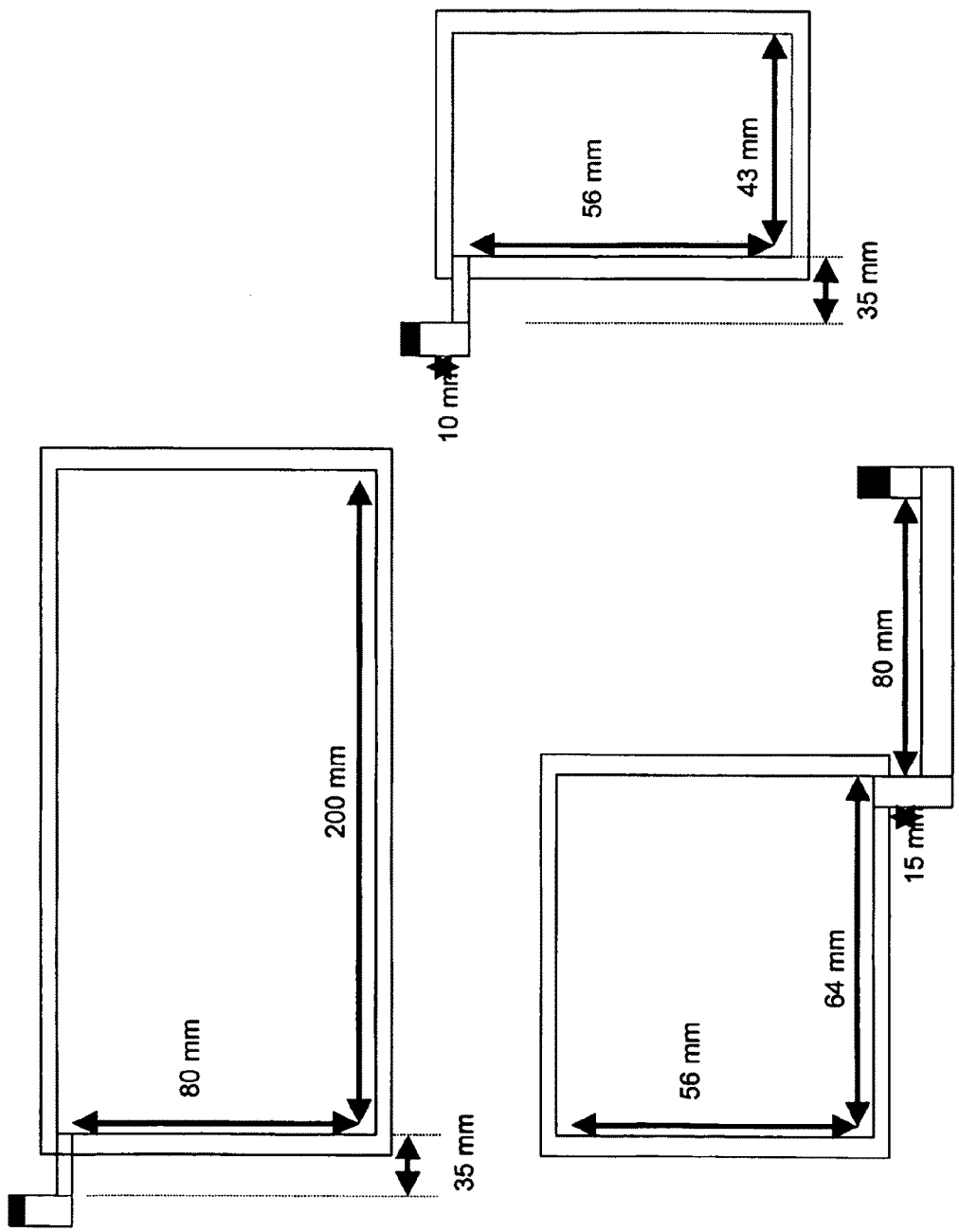
FIG. 4 shows typical dimensions of the individual touch screens integrated underneath the display according to the present invention.

As stated above, a touch sensitive display device is provided by the present invention. Preferably, the touch sensitive display device incorporates two or more keyboards. Preferably, four keyboards are incorporated within the overall keyboard structure comprising a principal keyboard and three sub-keyboards, although other configurations may be used. Typical dimensions of these keyboards are seen in FIG. 4. Two of the sub-keyboard touch screens have an active area of 56 mm×43 mm and a further sub-keyboard touch screen has an active area of 56 mm×64 mm. The principal touch screen has an active area of 210 mm×80 mm. Each touch screen has a thickness of approximately 0.5 mm.

Figure 1:
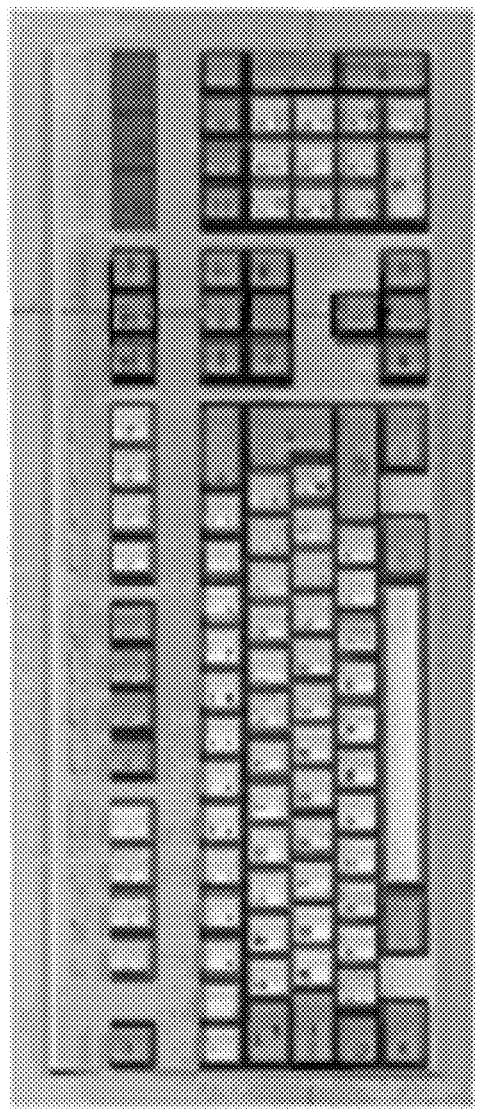
FIG. 1 shows a photograph of a conventional QWERTY keyboard according to the prior art.
Figure 2:
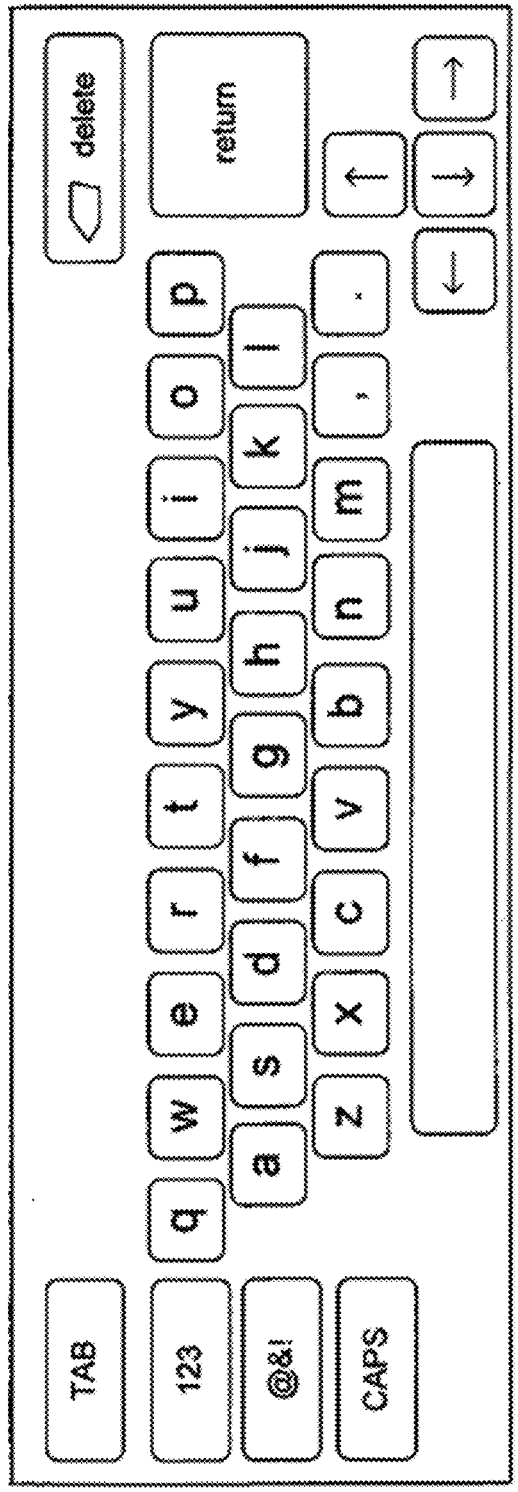
FIG. 2 shows a touch screen keyboard without the multi-touch function option according to the prior art.
Figure 3:
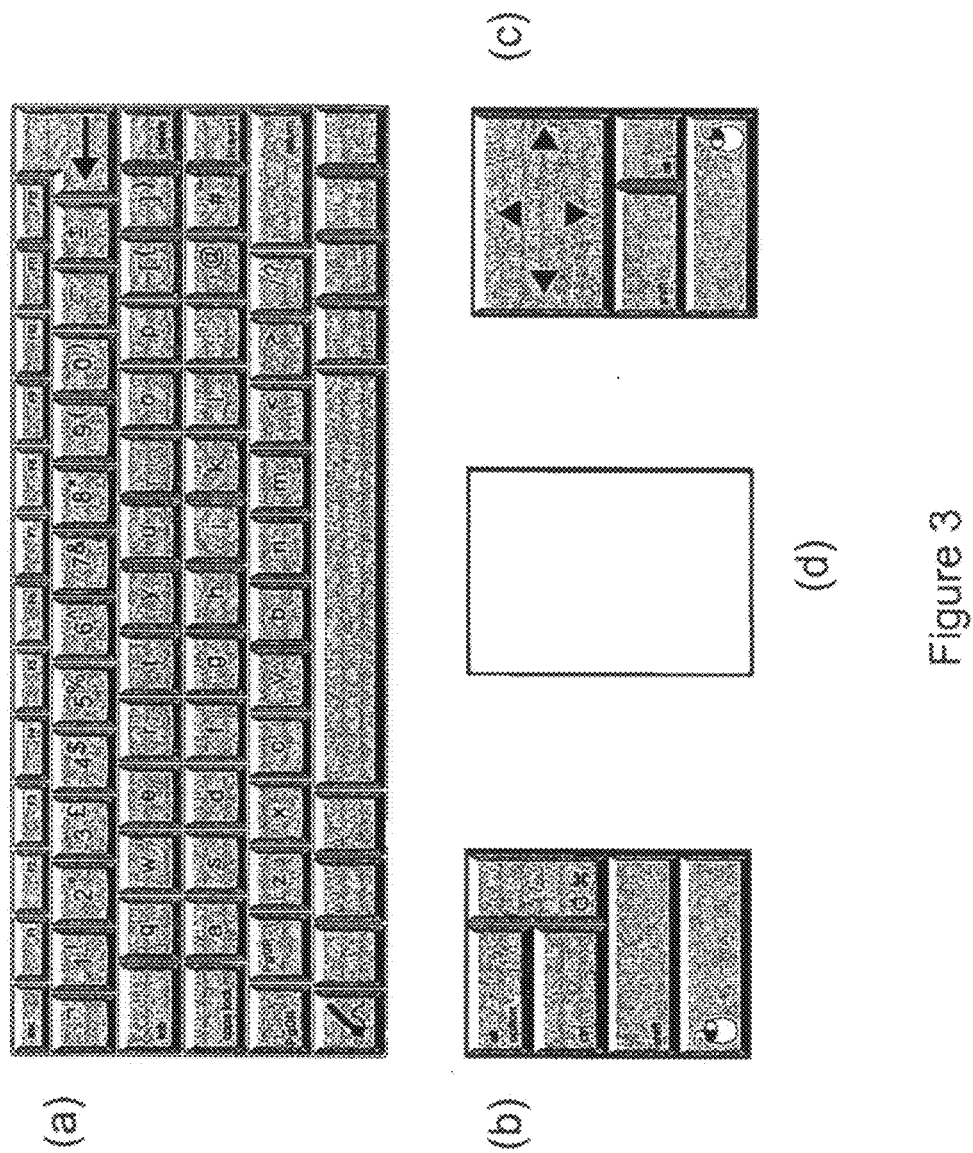
FIG. 3 illustrates a fully functional flexible resistive multi-touch key input touch screen according to the present invention.

The principal keyboard contains the main QWERTY keyboard form mainly incorporating all of the letter keys and is shown in FIG. 3(*a*). The second keyboard that is represented in FIG. 3(*b*) is a sub-keyboard that preferably contains the SHIFT, ALT, CTRL, and WINDOWS keys. In addition, the left mouse button would also be incorporated within said second keyboard. In the first embodiment the third keyboard that is shown in FIG. 3(*c*) contains the cursor key and right mouse button. Finally, the mouse movement is seen in FIG. 3(*d*) as being represented in the preferred example by the central touch pad.

As described above in FIG. 5, the touch screens 12 are required to be adhered to a mechanically sufficiently strong base 11 in order to prevent the screen becoming damaged when touched by the user and to avoid the screens registering non-existing touches if accidentally bent.

Figure 10:
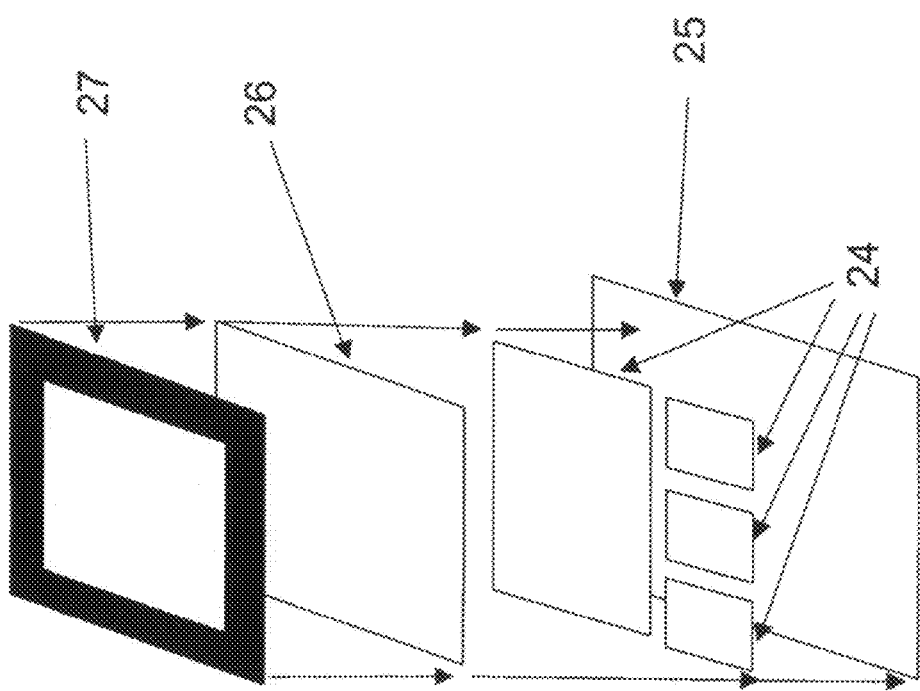
FIG. 10 illustrates a flexible display positioned above a touch screen with a support frame surrounding the display protecting the passive areas.

Another schematic side view of the structure is shown in FIG. 10. The base material 25 may consist of any light weight, hard wearing material. If the display is required to be flexible, the base material is selected to be a mechanically sufficiently strong plastic, or thin glass or metal substrate. The base material may also be a rigid substrate such as a thick glass substrate. Typical dimensions of the touch screen base were of a thickness of 6 mm, a width of 356 mm and a length of 293 mm. The flexible display 26 is seen in FIG. 10 to be positioned above the touch screens 24 with a support frame 27 surrounding the display to protect the passive areas as is described below.

Figure 7:
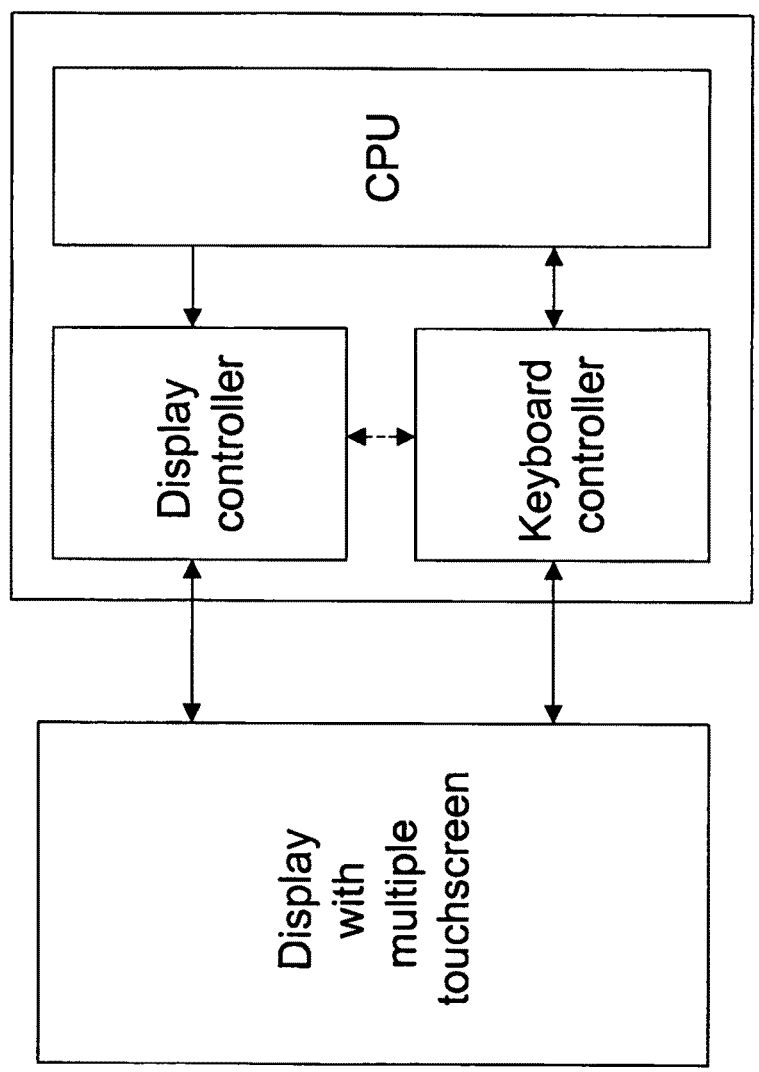
FIG. 7 shows a schematic diagram of the multi-touch touch screen display connected to a host system.

FIG. 7 shows one possible configuration for connecting the display with integrated multi-touch touch screen to a host controller. The display backplane is connected to the display controller. In the case of an active matrix display preferably the row and column driver chips are integrated on the flexible display, for example by using tape-carrier-packages, in order to reduce the number of connections between the flexible display and the display controller. The wires from each of the separate touch screen elements are fed into a touch-screen controller unit which is able to communicate with the central processing unit (CPU) to register the user input and in response to which the CPU sends suitable signals to the display controller to update the image on the display.

Figure 8:
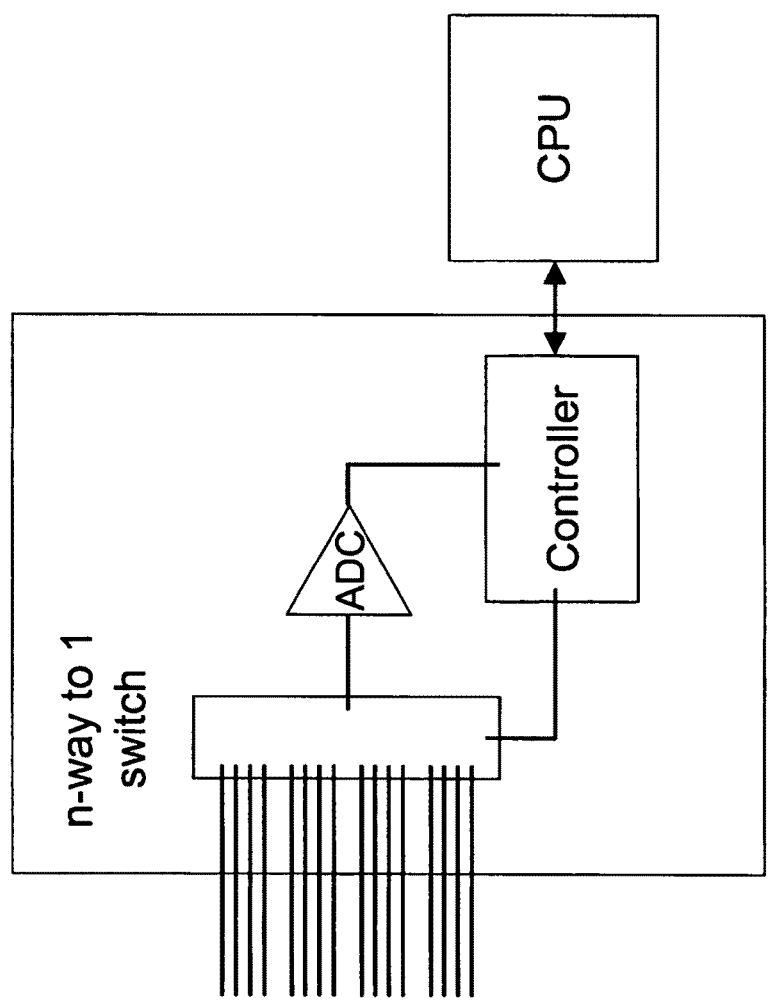
FIG. 8 shows a possible integration scheme for a multi-touch touch screen controller.

FIG. 8 shows one possible configuration of a multi-touch touch screen controller. The wires leading to the individual touch screens are fed into an input n-way to 1 switch (n may be equal to 16 for four 4-wire touch screens). An analog-to-digital converter records in turn the voltage signals on each wires and then uses a conventional algorithm to determine from the recorded voltages for each of the touch screen elements whether and at which position each of the separate touch screen elements has been activated by user input. Advantageously, the multi-touch screen controller described processes the signals from wires belonging to different touch screens in sequence. Of course, alternatively it is possible to use individual touch-screen controllers for each of the touch screen elements.

Example 2

A multi-touch resistive touch screen is integrated with a flexible display by mounting a number of discrete touch screen elements fabricated on separate substrates underneath the flexible display.

Figure 9:
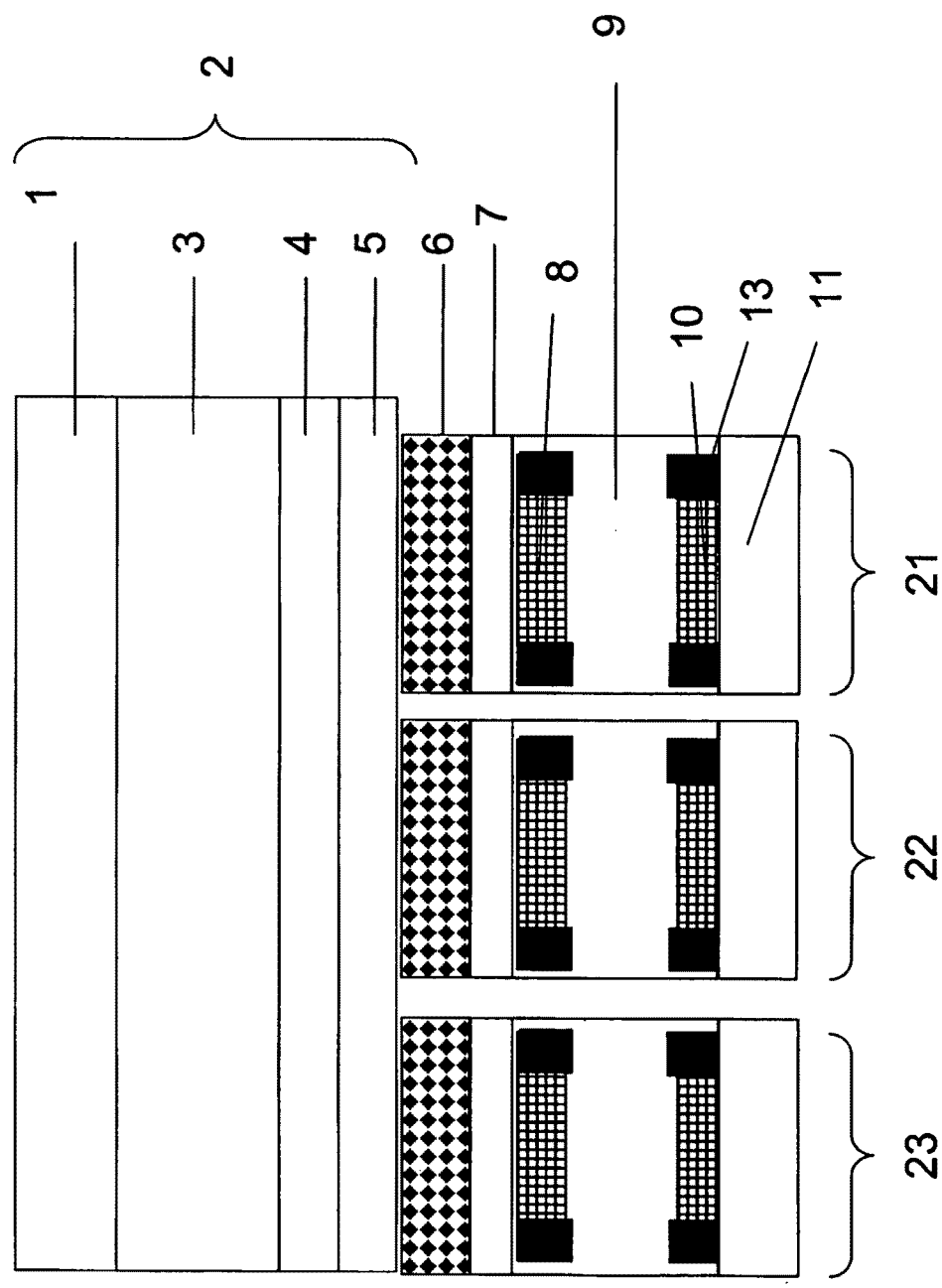
FIG. 9 shows a schematic cross-sectional diagram of a multi-touch touch screen integrated with a flexible display according to example 2 of the present invention.

The second embodiment of the present invention may utilise an integrated touch-screen with individual touch-sensitive elements integrated in suitable positions on a single substrate. This might be generally advantageous for most commercial, high volume products. However, it is also possible to mount a number of discrete touch screen touch sensitive elements on separate substrate onto the back of the display. In this case standard, commercially available touch-screen components can be used. In the second embodiment the individual touch screen touch sensitive elements are mounted onto the bottom display substrate in position so as to allow the operation of the touch screen by two or more simultaneous touches of the touch screen display by the user. As shown in FIG. 9 the integration and layer sequence for each of the resistive touch screen touch sensitive elements 21, 22, and 23 is analogous to the one described above under example 1 (with reference to FIG. 5). As stated above for the integration of the individual touch screens, the assembly component of touch screens is adhered to the substrate utilizing a pressure sensitive adhesive (PSA) 6.

FIG. 9 shows a device configuration for discrete resistive touch screen touch sensitive elements 21, 22, and 23 integrated with a flexible display 2. The flexible display comprises a substrate 5, display backplane 4 comprising, for example, an active matrix of thin-film transistors or a passive matrix of interconnect lines, a display medium 3 and a top substrate 1 comprising also the counter electrodes to apply voltage signal across the individual pixel of the display. Preferably, an electrophoretic display media is incorporated within the device structure and is located over the back plane. The back plane incorporates a flexible substrate 5 in order to enable transmitting the pressure signal caused by the user input to the resistive touch screen mounted underneath the display. The substrate 5 may be a thin flexible glass or plastic substrate or a flexible metallic foil. Preferably the flexible substrate consists of a polymer film, such as polyethyleneterephtalate (PET) or polyethylenenaphtalene (PEN). The display media 3 with the top substrate 1 and display back plane 4 are laminated together.

The individual touch screens are integrated onto the substrate of the device by adhering each touch screen directly to the back plane, for example, by utilizing a suitable pressure sensitive adhesive (PSA) 6.

As is disclosed in patent number GB0515175.8 the above described configuration allows for 100% optical clarity to be achieved by incorporating a touch screen component onto the backside of the flexible display. FIG. 9 also illustrates the resistive touch screen touch sensitive elements 21, 22, and 23 that are located on the underneath side of the device. A conducting lower layer 10 is deposited over a bottom substrate 13. The bottom substrate 13 is preferably also a flexible substrate, such as polyethyleneterephtalate (PET) or polyethylenenaphtalene (PEN). Alternatively, in situations where overall flexibility of the device is not a requirement, the bottom substrate 13 may also be a rigid substrate, such as a glass substrate or a rigid plastic substrate, or a flexible substrate mounted onto a rigid carrier, such as a rigid casing. Mounting the touch-screen sensors onto a rigid support has the advantage of improving the sensitivity of the touch screen to applied pressure from the top as it prevents deformation of the lower substrate in response to applied local pressure. Generally, the choice of the bottom substrate 13 is less critical for the operation of the touch screen than of the other substrate below and can be chosen according to whether the device is used as a rigid, conformal or truly flexible device.

A layer of insulating spacer dots 9 are positioned over the lower conductor layer, followed by a further upper layer of conducting material 8, which may be of the same material as the lower layer of conductor material. The spacer dots are positioned in between the conductive layers, in order to separate the said lower and upper conductor layers 10, 8. An upper flexible substrate film 7, such as, but not limited to a plastic substrate, such as PET or PEN, a thin metal foil substrate, such as steel, or a thin glass substrate completes the resistive touch screen component, by forming the upper substrate of the said component. A preferred thickness of the upper substrate material is between 25 μm-50 μm in order to achieve optimum sensitivity of the touch screen to local pressure applied from the top. Preferably the substrate is a plastic substrate.

In the second embodiment of the invention, the conductive layers 10, 8 of the touch screen can be fabricated from either transparent conductors such as ITO, or non-transparent conductor material, such as a thin metallic layer. In many cases a highly conducting interconnect such as silver, aluminium or copper is used around the edges of the touch screen electrode 10 in order to minimize resistive voltage drops along the interconnects that connect the electrode 10 to the connectors on the edge of the touch screen.

As with the first embodiment, each of the touch sensitive elements define a region of the viewing surface of the display, wherein the action of a touch of the viewing surfacing within a region will produce an output from the associated touch sensitive element in response to that touch.

In contrast to a device structure where the resistive touch screen is located on top of the display, i.e. in between the user and the display medium, the configuration described here, where the touch screen is hidden from the user behind the display does not require the touch screen to be transparent. Thus, cheap, non-transparent metals such as copper or aluminium can be used for the electrode of the touch screen. Within this novel device configuration, the ability to use a non-transparent conductive material can be used to increase the flexibility of the resistive touch screen device, as thin films of ductile metals are often more flexible than the use of a brittle ceramic such as ITO. In addition, the use of metallic materials for the conductive layers will also have the effect of reducing costs, as thin films of metallic material are generally cheaper materials than ITO. In addition, the effects of the use of metallic layers may also be seen in general performance improvements within the touch screen component, due to the fact that higher conductivity levels may be achieved with metallic materials than with ITO. A particular advantage of mounting the touch screen components underneath the display is that for a reflective or emissive display medium the opaque electrodes 13 are not visible from the surface of the display and do not reduce the active area of the display.

To achieve good sensitivity of the touch screen to applied pressure from the top, the upper substrate of the touch screen 7, and the bottom and top substrates 5 and 1 of the flexible display as well as the other layers above the touch screen should be as thin as possible, while maintaining sufficient mechanical integrity and rigidity during manufacture as well as operation. Preferably the thickness of these substrates is on the order of 10-150 µm, more preferably on the order of 20-75 µm.

A 4-wire touch screen technology may be used, in which each touch screen is addressed by four wires, two connected along the x-direction to the upper electrodes 8 and two along the y-direction to the lower electrode 10. Other touch screen configurations may be used. The addressing lines from each of the touch screens 14, 15, 16, and 17 integrated together on the substrate 18 connect the touch screen elements to the touch screen controller 20.

As stated above, a touch sensitive display device is provided by the present invention. Preferably, the touch sensitive display device incorporates two or more keyboards. Preferably, four keyboards are incorporated within the overall keyboard structure, comprising a principal keyboard and three sub-keyboards, although other configurations may be used. Typical dimensions of these keyboards are seen in FIG. 4. Two of the sub-keyboard touch screens have an active area of 56 mm×43 mm and a further sub-keyboard touch screen has an active area of 56 mm×64 mm. The principal touch screen has an active area of 210 mm×80 mm. Each touch screen has a thickness of approximately 0.5 mm.

The principal keyboard contains the main QWERTY keyboard form mainly incorporating all of the letter keys and is shown in FIG. 3(*a*). The second keyboard that is represented in FIG. 3(*b*) is a sub-keyboard that preferably contains the SHIFT, ALT, CTRL, and WINDOWS keys. In addition, the left mouse button would also be incorporated within said second keyboard. In the second embodiment, the third keyboard that is shown in FIG. 3(*c*) contains the cursor key and right mouse button. Finally, the mouse movement is seen in FIG. 3(*d*) as being represented in the preferred example by the central touch pad.

As described above in FIG. 9, the resistive touch screen touch sensitive elements 21, 22, and 23 are required to be adhered to a mechanically sufficiently strong base 11 in order to prevent the screen becoming damaged when touched by the user and to avoid the screens registering non-existing touches if bent.

Another schematic side view of the structure is shown in FIG. 10. The base material 25 may consist of any light weight, hard wearing material. If the display is required to be flexible, the base material is selected to be a mechanically sufficiently strong plastic, or thin glass or metal substrate. The base material may also be a rigid substrate such as a thick glass substrate. Typical dimensions of the touch screen base were of a thickness of 6 mm, a width of 356 mm and a length of 293 mm. The flexible display 26 is seen in FIG. 10 to be positioned above the touch screens 24 with a support frame 27 surrounding the display to protect the passive areas as is described below.

FIG. 7 shows one possible configuration for connecting the display with integrated multi-touch touch screen to a host controller. The display backplane is connected to the display controller. In the case of an active matrix display preferably the row and column driver chips are integrated on the flexible display, for example by using tape-carrier-packages, in order to reduce the number of connections between the flexible display and the display controller. The wires from each of the separate touch screen elements are fed into a touch-screen controller unit which is able to communicate with the central processing unit (CPU) to register the user input and in response to which the CPU sends suitable signals to the display controller to update the image on the display.

FIG. 8 shows one possible configuration of a multi-touch touch screen controller. The wires leading to the individual touch screens are fed into an input n-way to 1 switch (n may be equal to 16 for four 4-wire touch screens). An analog-to-digital converter records in turn the voltage signals on each wires and then uses a conventional algorithm to determine from the recorded voltages for each of the touch screen elements whether and at which position each of the separate touch screen elements has been activated by user input. Advantageously, the multi-touch screen described processes the signals from wires belonging to different touch screens in sequence. Of course, alternatively it is possible to use individual touch-screen controllers for each of the touch screen elements.

Figure 11:
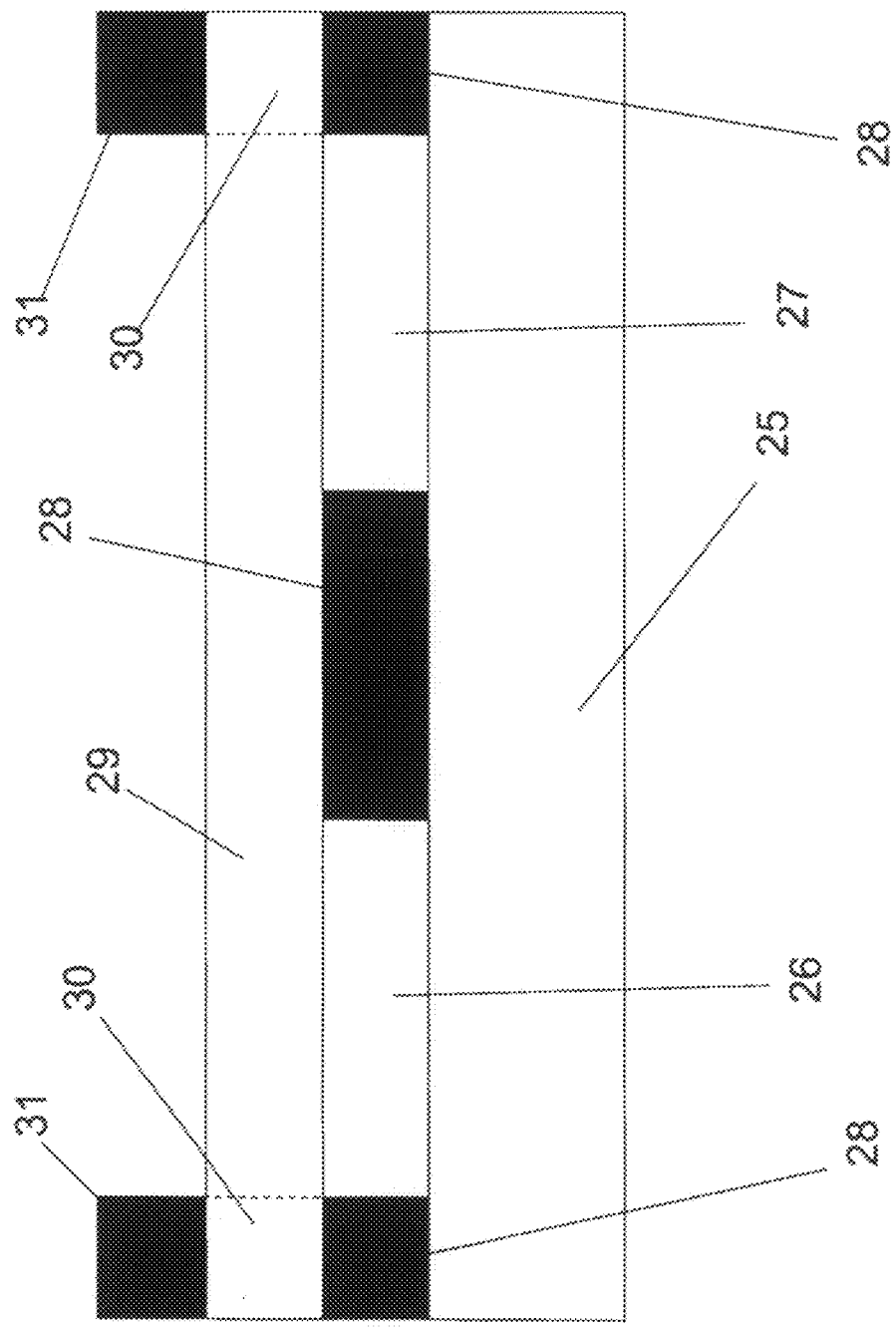
FIG. 11 shows a schematic of a touch screen device incorporating the boarder of the display filled with a base material protecting the routing and covering the passive area.

The assembly may be protected against delamination and mechanical damage. An Example is shown in FIG. 11. Any air gaps that are formed in between the touch screens 26, 27 or at the border of the display are filled with a spacer/sealant material 28 which may be of the same material as the base 25 of the keyboard in order to protect the routing around the display 29 and/or to cover the passive area 30. A top cover layer 31 may also be used to further protect the edges of the assembly.

Figure 12:
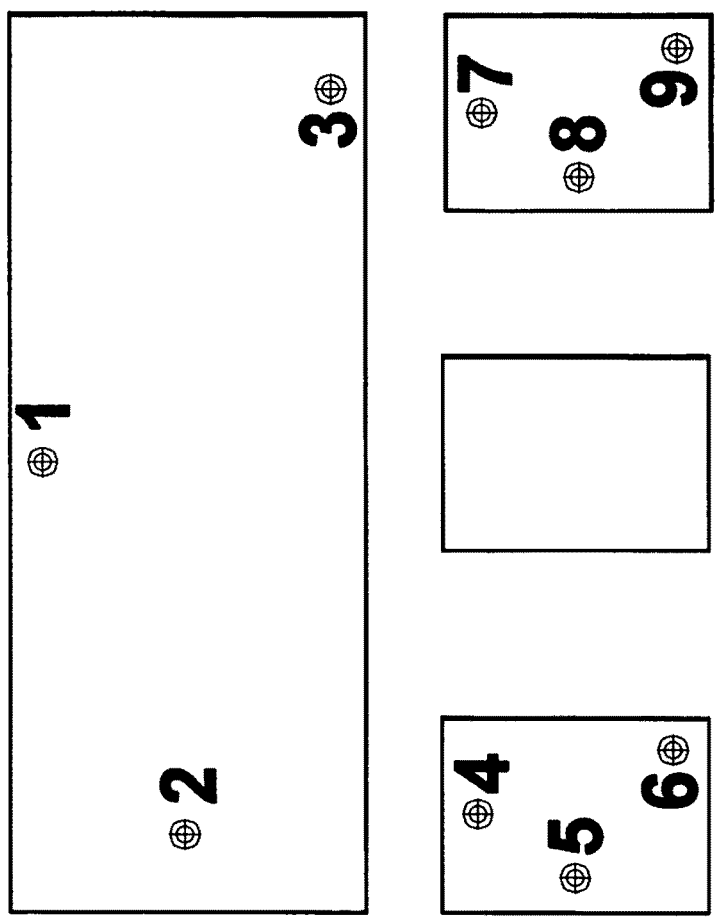
FIG. 12 illustrates a standard calibration routine to calculate a matrix which provides the relationship between the position on the screen where the user operates the touch screen by touch and the raw data produced by each touch screen.

Once the touch screens are mounted onto the base material, either as individual touch screens or as an assembly of multiple touch screens, it is preferable to calibrate each of the touch screens before use. When being operated by a user, each touch screen produces raw data. This data is relative to the position on the screen where the user operated the touch screen by touch. A screen calibration routine was used by obtaining at least two points and preferably three or more points for each touch screen in order to calculate a matrix which provides this relationship as is shown in FIG. 12.

Once the user touches a point on the touch screen, the information is recorded and produces raw data. The real pixel coordinates of each of the pixel positions are known (for example, when calibrating by obtaining three using there will be nine pixel positions for three touch screens being touched) and the relation matrix for each touch screen is then calculated. The main software then initialises the display and shows the keyboard as in FIG. 3.

When the user presses on the display, and therefore on one of the touch screens, the software first determines which screen has been touched and then identifies the coordinates. The software is able to identify which button the user touched and reacts accordingly by sending the associated signal to the operating system. Therefore, if the user touches 'Shift+a', the software will activate the associated signal for 'shift' and 'a' simultaneously.

The present invention is not limited to the foregoing examples. Aspects of the present invention include all novel and inventive aspects of the concepts described herein and all novel and inventive combinations of the features described herein.

For example, the keys defining the keyboard may comprise keys such as shift, alt, control, caps, num, function or operation keys. This is not intended to be an exhaustive list and other keys and combinations of keys will be apparent to those skilled in the art without departing from the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A touch sensitive display device comprising:
   a display fabricated on a first flexible substrate having a thickness of d2, the display having a viewing surface, a display medium and a second flexible substrate between the display medium and the viewing surface, the second flexible substrate having a thickness of d1; and
   a plurality of resistive touch sensitive elements under the display, each of the plurality of resistive touch sensitive elements is discrete from each of the other resistive touch sensitive elements, the resistive touch sensitive elements being operable by touching the viewing surface of the display, and each of the plurality of resistive touch sensitive elements having an output for outputting a signal responsive to the viewing surface being touched,
   wherein each of the plurality of resistive touch sensitive elements defines a non-overlapping region of the viewing surface in which the resistive touch sensitive element produces an output in response to a touch, wherein the plurality of resistive touch sensitive elements are arranged such that two or more simultaneous touches of different regions of the viewing surface produces output signals corresponding to the two or more touches of the viewing surface,
   wherein each of said resistive touch sensitive elements comprises its own separate upper sensor substrate having a thickness of d3 and its own separate lower sensor substrate having a thickness of d4 and each of the upper and lower sensor substrates is flexible;
   wherein the thickness of each lower sensor substrate d4 is defined as: $d4 > d1 + d2 + d3$;
   wherein said resistive touch sensitive elements are in a neutral axis of the touch sensitive display device;
   wherein each of the resistive touch sensitive elements comprises its own separate upper conducting layer on said separate upper sensor substrate and its own separate lower conducting layer on said separate lower sensor substrate; and
   wherein each of the separate upper conducting layers are mutually electrically isolated from one another and each of the separate lower conducting layers are mutually electrically isolated from one another.

2. The device of claim 1, wherein the first flexible substrate comprises polyethyleneterephtalate (PET) or polyethyleneaphtalene (PEN).

3. The device according to claim 1, wherein the display comprises a display backplane.

4. The device of claim 3, wherein the display backplane comprises an active matrix of thin-film transistors.

5. The device of claim 3, wherein the device includes a plurality of interconnections for connecting components of the device to one another.

6. The device according to claim 1 configured as a keyboard, and wherein the regions define keys of the keyboard.

7. The device according to claim 6, wherein one or more of the regions define one or more of a shift, control, alt, caps, num, function or operation key.

8. The device according to claim 6, wherein one or more of the regions define a QWERTY keyboard.

9. The device as claimed in claim 6 further comprising a region defining a mouse track-pad.

10. The device according to claim 3, wherein the display includes an electrophoretic display medium over the display backplane.

11. The device according to claim 1, wherein the output signals corresponding to the two or more touches of the viewing surface are produced simultaneously.

12. The device according to claim 1 further comprising a touch sensor controller, wherein the output of the plurality of resistive touch sensitive elements is coupled to the controller; and wherein the controller is configured to identify simultaneous touches of the regions and to output a touch signal responsive to the identification.

13. The device according to claim 1 wherein said display includes a multilayer electronic structure adapted to solution deposition.

14. The device of claim 13 wherein said multilayer electronic structure comprises an active matrix backplane of said display.

15. The device of claim 14, wherein said active matrix comprises an array of field-effect transistors comprising an organic semiconductor.

16. The device of claim 15, wherein said organic semiconductor is a solution-processed polymer semiconductor.

17. The device of claim 15, wherein said field-effect transistor comprises an organic gate dielectric.

18. The device of claim 17, wherein said organic gate dielectric is a solution-processed polymer dielectric.

19. The device of claim 17, wherein said organic gate dielectric is deposited by chemical vapour deposition.

20. The device of claim 19, wherein said organic gate dielectric is parylene.

21. The device according to claim 17, wherein said organic gate dielectric has a thickness between 200 nm and 1 micron.

22. A flexible display device incorporating a touch sensitive keyboard, said device comprising:
   a display fabricated on a first flexible substrate having a thickness of d2, the display having a viewing surface, a display medium and a second flexible substrate between the display medium and the viewing surface, the second flexible substrate having a thickness of d1; and
   a resistive touch sensor behind said display surface;
   wherein said resistive touch sensor has at least two non-overlapping regions each with its own upper and lower electrical contacts, the upper electrical contacts of the at least two non-overlapping regions electrically separate from one another and the lower electrical contacts of the at least two non-overlapping regions electrically separate from one another, a first of said regions being configured to define a plurality of user-operable keys, a second of said regions being configured to define at least one user-operable combination key for operation in combination with one of said plurality of keys;
   wherein said device has electrical output connections which enable operation of said combination key simultaneously with operation of one of said plurality of keys to be detected,
   wherein the upper electrical contact of each region of the resistive touch sensor is on its own separate upper flexible sensor substrate having a thickness of d3 and the lower electrical contact of each region of the resistive touch sensor is on its own separate lower sensor substrate having a thickness of d4; wherein the thickness of each lower sensor substrate d4 is defined as: $d4 > d1 + d2 + d3$; and
   wherein said resistive touch sensor is in a neutral axis of the flexible display device.

23. A flexible display device as claimed in claim 22, wherein said at least one user-operable combination key comprises a plurality of said combination keys.

24. A flexible display device as claimed in claim 23, wherein a said combination key of said at least one user-operable combination key comprises one of a shift, control, alt, caps, num, function or operation key.

25. A method of producing a touch screen component comprising a display and a plurality of resistive touch screen elements, the method comprising:
  fabricating the display on a first flexible substrate, the first flexible substrate having a thickness of d2, the display having a viewing surface, a display medium and a second flexible substrate between the display medium and the viewing surface, the second flexible substrate having a thickness of d1, each resistive touch screen element comprising its own separate upper sensor substrate having a thickness of d3 and its own separate lower flexible sensor substrate having a thickness of d4;
  mounting the plurality of resistive touch screen elements under the display such that each of the plurality of resistive touch screen elements defines a non-overlapping region of the viewing surface in which each of the resistive touch screen elements produces an output in response to a touch of the viewing surface, and such that two or more simultaneous touches of different regions of the viewing surface produces an output signal from an output of the resistive touch screen elements corresponding to the two or more touches of the viewing surface; and
  fabricating each of said resistive touch screen elements on said lower flexible sensor substrate of the resistive touch screen element; wherein the thickness of each lower flexible sensor substrate d4 is defined as: d4>d1+d2+d3;
  wherein said resistive touch screen elements are in a neutral axis of the touch screen component;
  wherein each of the resistive touch screen elements comprises its own separate upper conducting layer on said separate upper sensor substrate and its own separate lower conducting layer on said separate lower flexible sensor substrate; and
  wherein each of the upper conducting layers are mutually electrically isolated from one another and each of the lower conducting layers are mutually electrically isolated from one another.

26. A method of producing a touch signal responsive to two or more simultaneous touches of two or more regions of a viewing surface of a ouch sensitive display device, wherein the touch sensitive display device comprises:
  a display fabricated on a first flexible substrate having a thickness of d2, the display having a viewing surface, a display medium and a second flexible substrate between the display medium and the viewing surface, the second flexible substrate having a thickness of d1; and
  a plurality of resistive touch sensitive elements under the display, each of the plurality of resistive touch sensitive elements being operable by touching the viewing surface of the display, and each of the plurality of resistive touch sensitive elements having an output for outputting a signal responsive to the viewing surface being touched,
  wherein each of the plurality of resistive touch sensitive elements defines a non-overlapping region of the viewing surface in which the resistive touch sensitive element produces an output in response to a touch, and the two or more regions correspond to two or more different regions defined by the resistive touch sensitive elements,
  wherein the plurality of resistive touch sensitive elements are arranged such that two or more simultaneous touches of different regions of the viewing surface produces output signals corresponding to the two or more touches of the viewing surface, and
  wherein each of said resistive touch sensitive elements comprises its own separate upper sensor substrate having a thickness of d3 and its own separate lower sensor substrate having a thickness of d4 and each of the upper and lower sensor substrates is flexible;
  wherein the thickness of each lower sensor substrate d4 is defined as: d4>d1+d2+d3;
  wherein said resistive touch sensitive elements are in a neutral axis of the touch sensitive display device;
  wherein each of the resistive touch sensitive elements comprises its own separate upper conducting layer on said upper sensor substrate and its own separate lower conducting layer on said lower sensor substrate; and
  wherein each of the upper conducting layers are mutually electrically isolated from one another and each of the lower conducting layers are mutually electrically isolated from one another;
  the method comprising:
    receiving a signal from each of the resistive touch sensitive elements corresponding to the two or more regions being touched;
    identifying the two or more regions being touched using the signals from the resistive touch sensitive elements; and
    outputting a touch signal responsive to the identification.

* * * * *